(12) United States Patent
Kumar

(10) Patent No.: US 10,476,946 B2
(45) Date of Patent: Nov. 12, 2019

(54) HEURISTICS FOR SELECTING NEAREST ZONE BASED ON ICA RTT AND NETWORK LATENCY

(71) Applicant: Citrix Systems, Inc., Fort Lauderdale, FL (US)

(72) Inventor: Kiran Kumar, Karnataka (IN)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 1 day.

(21) Appl. No.: 15/661,296

(22) Filed: Jul. 27, 2017

(65) Prior Publication Data

US 2019/0037011 A1   Jan. 31, 2019

(51) Int. Cl.
*H04L 29/08* (2006.01)
*H04L 12/24* (2006.01)
*H04L 12/26* (2006.01)
*H04L 12/727* (2013.01)

(52) U.S. Cl.
CPC ........ *H04L 67/101* (2013.01); *H04L 41/0893* (2013.01); *H04L 41/5051* (2013.01); *H04L 43/04* (2013.01); *H04L 43/0864* (2013.01); *H04L 45/121* (2013.01); *H04L 41/5096* (2013.01)

(58) Field of Classification Search
CPC ............... H04L 67/101; H04L 41/0893; H04L 41/5051; H04L 43/04; H04L 43/0864; H04L 45/121
USPC ......................................................... 709/224
See application file for complete search history.

(56) References Cited

U.S. PATENT DOCUMENTS

| | | | |
|---|---|---|---|
| 6,009,239 A * | 12/1999 | Morita | G06N 5/025 706/47 |
| 9,767,196 B1 * | 9/2017 | Peng | G06F 17/30861 |
| 9,942,787 B1 * | 4/2018 | Tillotson | H04L 12/4641 |
| 2007/0192474 A1 * | 8/2007 | Decasper | H04L 67/306 709/223 |
| 2010/0094970 A1 * | 4/2010 | Zuckerman | H04L 67/1008 709/219 |
| 2013/0211909 A1 * | 8/2013 | Tanaka | G06Q 30/0246 705/14.45 |
| 2016/0187909 A1 * | 6/2016 | Cai | G05F 1/66 700/295 |

* cited by examiner

*Primary Examiner* — Nicholas R Taylor
*Assistant Examiner* — Meng Vang
(74) *Attorney, Agent, or Firm* — Foley & Lardner LLP; Christopher J. McKenna

(57) ABSTRACT

Described embodiments provide systems and methods for zone selection for distributed services. A device records latency data measured for interactions between each of a plurality of clients and a service hosted by servers in two or more zones. The device directs network communications from each of the plurality of clients to respective servers hosting the service based on zones assigned to each of the plurality of clients. The device assigns clients to zones based on the recorded latency data. For example, the device identifies a grouping for a client, determines whether the recorded latency data indicates that latency for clients in the grouping is increasing faster than a threshold rate, and selects, responsive to the determination, a zone indicated by a selected set of recorded latency data as lowest in latency.

20 Claims, 4 Drawing Sheets

HEURISTICS FOR SELECTING NEAREST ZONE BASED ON ICA RTT AND NETWORK LATENCY

BACKGROUND

Distributed network services may be provided by servers situated in distinct zones, such that client devices accessing the service are supported by servers in a zone designated for the client device. However, static zone designations can lead to imbalance. Some zones may become over-subscribed or may support high-demand clients. This can result in poor service for clients within an over-subscribed or heavily loaded zone. Furthermore, other zones may have unused capacity and/or clients with lower support requirements than the high-demand clients. The resources in such zones are under-utilized and effectively wasted.

SUMMARY

This Summary is provided to introduce a selection of concepts in a simplified form that are further described below in the Detailed Description. This Summary is not intended to identify key features or essential features, nor is it intended to limit the scope of the claims included herewith.

In at least one aspect, described is a method for describes a method for zone selection for distributed services. The method includes recording, by a device comprising a processor, latency data measured for interactions between each of a plurality of clients and a service hosted by servers in two or more zones. The method includes directing, by the device, network communications from each of the plurality of clients to respective servers hosting the service based on zones assigned to each of the plurality of clients. The method includes assigning, by the device, a first client to a first zone by: identifying a first grouping for the first client, determining, for the first client, that the recorded latency data indicates that latency for clients in the first grouping is not increasing faster than a threshold rate, and selecting, responsive to the determining for the first client, a first zone indicated by a first set of recorded latency data as lowest in latency. The method includes assigning, by the device, a second client to a second zone by: identifying a second grouping for the second client, determining, for the second client, that the recorded latency data indicates that latency for clients in the second grouping is increasing faster than the threshold rate, and selecting, responsive to the determining for the second client, a second zone indicated by a second set of the recorded latency data as lowest in latency, the second set differing from the first set of the recorded latency data.

In at least one aspect, described is a system for zone selection for distributed services, the system including a processor configured to record latency data measured for interactions between each of a plurality of clients and a service hosted by servers in two or more zones and direct network communications from each of the plurality of clients to respective servers hosting the service based on zones assigned to each of the plurality of clients. The processor is configured to assign a first client to a first zone by identifying a first grouping for the first client, determining, for the first client, that the recorded latency data indicates that latency for clients in the first grouping is not increasing faster than a threshold rate, and selecting, responsive to the determining for the first client, a first zone indicated by a first set of recorded latency data as lowest in latency. The processor is configured to assign a second client to a second zone by identifying a second grouping for the second client, determining, for the second client, that the recorded latency data indicates that latency for clients in the second grouping is increasing faster than the threshold rate, and selecting, responsive to the determining for the second client, a second zone indicated by a second set of the recorded latency data as lowest in latency, the second set differing from the first set of the recorded latency data.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

A distributed network service is provided by multiple servers and, more particularly, distributed across the multiple servers. In some configurations, the servers providing the distributed service are situated in distinct zones, such that different client devices accessing the service are supported by servers in different zones. In some such configurations, the clients are assigned to zones based on one or more factors. For example, client devices may be assigned to zones based on geography. For example, a client within a geographic zone may be assigned to servers within the same geographic zone. In some embodiments described herein, zone assignments are made based on heuristics. Heuristic input data is collected and used to dynamically assign client devices to respective zones based on a heuristic. Dynamic assignment allows clients that might previously have been assigned to an over-subscribed or heavily loaded zone to, instead, be assigned to a zone having unused capacity and/or servicing clients with lower support requirements. The described approaches to dynamic assignment based on collected heuristic data is an effective technical solution to problems that arise in server assignment for distributed services.

Figure 1A:
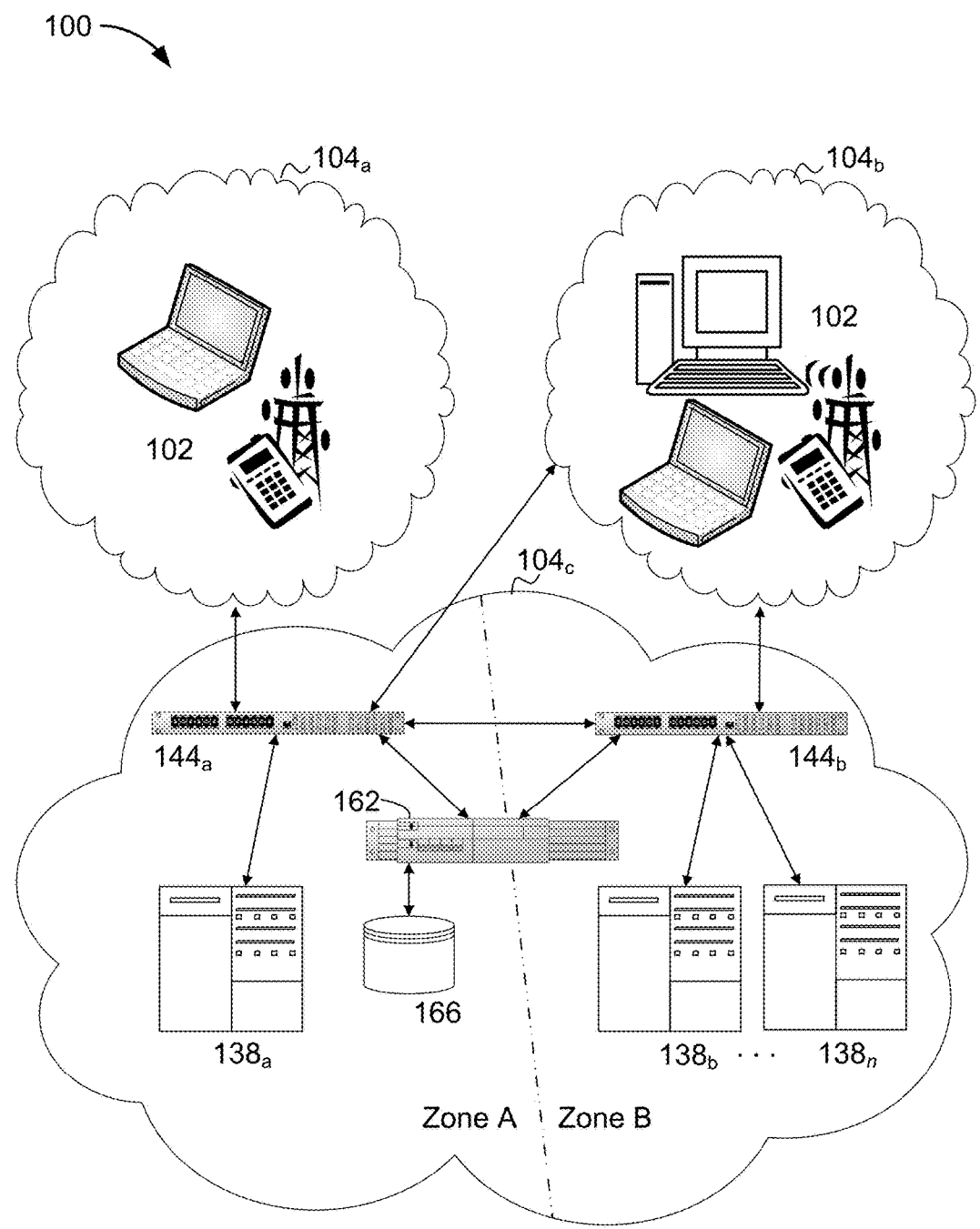
FIG. 1A is a block diagram of an illustrative network environment, in accordance with an illustrative embodiment.

FIG. 1A depicts an illustrative network environment. The network environment 100 includes client devices 102 in communication with servers 138$_{a-n}$ (referred to generally as servers 138) via various networks 104$_a$, 104$_b$, and 104$_c$ (referred to generally as networks 104). The servers 138 provide one or more network services to the client devices 102. The servers 138 are distributed into zones. In FIG. 1A, the network 104c is shown divided into two zones, designated "Zone A" and "Zone B", with an illustrative router 144$_a$ and an illustrative server 138$_a$ in Zone A and another illustrative router 144$_b$ and illustrative server 138$_b$ in Zone B. FIG. 1A shows an example server deployment using zones, other examples may be deployed differently, e.g., zones configured with any number of routers 144 and any number of servers 138. Network communications between the client devices 102 and the servers 138 are routed by routers 144$_a$ and 144$_b$ (generically referred to as routers 144), and assigned to zones by a controller 162. The controller 162 monitors, measures, or otherwise collects objective data for use in assigning the client devices 102 to the zones. For example, the controller 162 may store the collected data in a data storage system 166. Although not shown in FIG. 1A, there may be multiple controllers 162, e.g., multiple controllers 162 using a shared data storage system 166 to assign client devices to zones in a consistent manner.

Suitable examples of client devices 102 include various processor-based devices that execute instructions for interactions with servers 138 via a network 104. Some example client devices 102 receive input from a user and present output to the user. The client device 102 may be any kind of computing device, including, for example, a desktop computer, a laptop or notepad computer, a thin client, a mobile device such as a tablet or electronic "pad," a smart phone or data phone, a gaming system, or any other device capable of the functions described herein. The client devices 102 are capable of exchanging information with other computing devices via the network 104. For example, a client device 102 may exchange information over the network 104 using protocols in accordance with the Open Systems Interconnection ("OSI") layers, e.g., using an OSI layer-4 transport protocol such as the User Datagram Protocol ("UDP") or the Transmission Control Protocol ("TCP"), layered over an OSI layer-3 network protocol such as Internet Protocol ("IP"), e.g., IPv4 or IPv6. In some embodiments, the client device 102 supports network communication using Secure Socket Layer ("SSL") or Transport Layer Security ("TLS"), which encrypts communications layered over a reliable transport protocol (such as TCP). In some embodiments, the client device 102 is a thin-client, or functions as a thin-client, executing a thin-client protocol or remote-display protocol such as the Independent Computing Architecture ("ICA") protocol created by Citrix Systems, Inc. of Fort Lauderdale, Fla. The ICA protocol allows presentation at the client device 102 of software executing remotely (e.g., at a server 138), as though the remotely executed software were executed locally on the client device 102. In some embodiments, one or more of the servers 138 with which the client devices 102 communicate supports a custom instruction set, e.g., an application programming interface ("API"), and a custom application executed on the client device 102 implements the API. An application can implement an API using, for example, a library such as a dynamic link library ("DLL") or a software development kit ("SDK") provided to the application's developer.

Figure 1B:
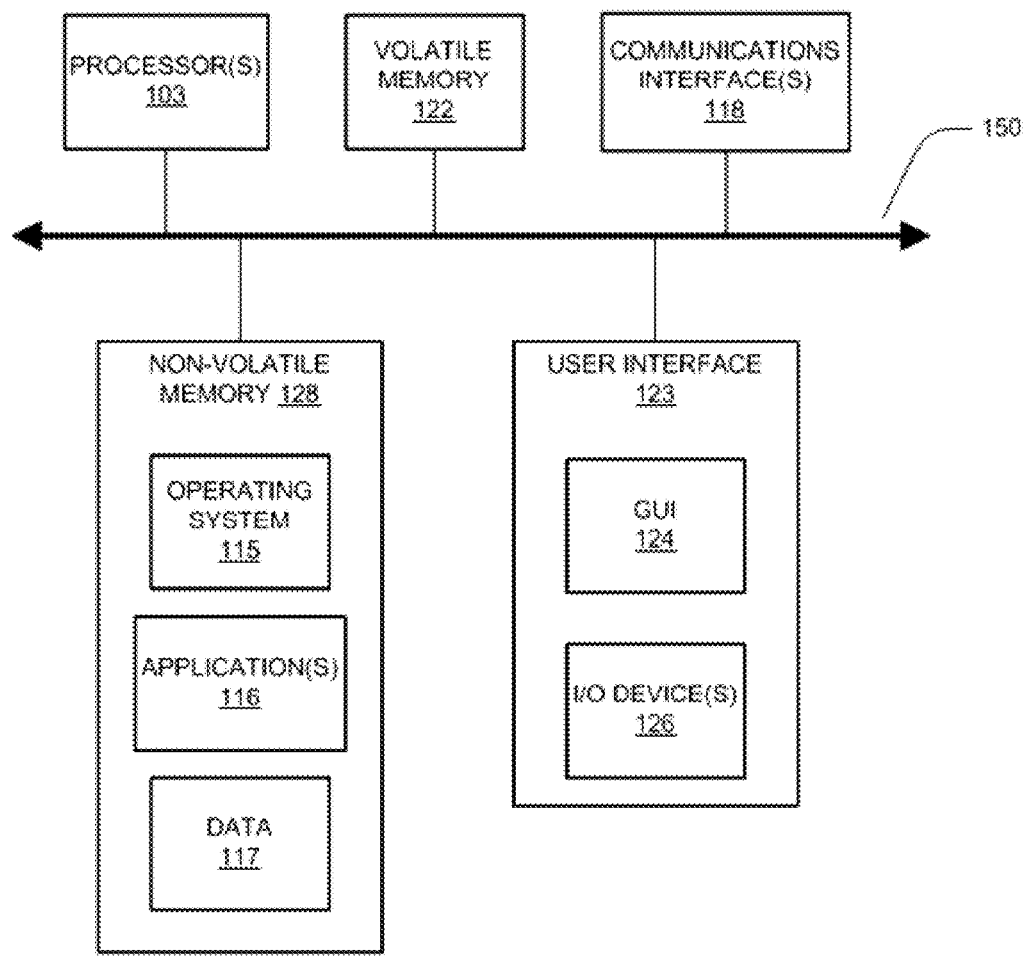
FIG. 1B is a block diagram of an example computing device, in accordance with an illustrative embodiment.

In some embodiments, the client device 102 includes one or more hardware elements for facilitating data input and data presentation. In some embodiments, the client device 102 is implemented using special purpose logic circuitry, e.g., an application specific integrated circuit ("ASIC"). In some embodiments, the client device 102 is implemented using a system on a chip ("SoC") semiconductor device that includes at least one processor (or microprocessor) core. In some embodiments, the client device 102 is implemented using a general purpose computing processor. FIG. 1B, described in more detail below, illustrates a computing device 101 that, in some configurations, is suitable for use as a client device 102.

The networks 104$_a$, 104$_b$, and 104$_c$ (referred to generally as a network 104) link devices for communication. In some embodiments, data flows through the network 104 as a flow of data packets in accordance with the OSI layers, e.g., as a TCP or ICA flow. An illustrative network 104 is the Internet; however, other networks may be used. Each network 104 may be an autonomous system ("AS"), i.e., a network that is operated under a consistent unified routing policy (or at least appears to from outside the AS network) and is generally managed by a single administrative entity (e.g., a system operator, administrator, or administrative group). A network 104 may be composed of multiple connected sub-networks or AS networks. Networks meet at boundary nodes such as gateway nodes or routers 144. A network 104 may include wired links, optical links, and/or radio links. A network 104 may include a telephony network, including, for example, a wireless telephony network implementing a wireless communication protocol such as the Global System for Mobile Communications ("GSM"), Code Division Multiple Access ("CDMA"), Time Division Synchronous Code Division Multiple Access ("TD-SCDMA"), Long-Term Evolution ("LTE"), or any other such protocol. The network 104 may be public, private, or a combination of public and private networks. The network 104 may be any type and/or form of data network and/or communication network. Although the embodiment shown in FIG. 1A shows multiple networks 104 between clients 102 and servers 138, in other embodiments, clients 102 and servers 138 may be on the same network 104.

As shown in FIG. 1A, one or more routers 144 may be located at various points or in various communication paths of network environment 100. For example, router 144$_a$ may be deployed between two networks 104$_a$ and 104$_c$, and router 144$_b$ may be deployed between two networks 104$_b$ and 104$_c$. The routers 144 are network nodes or network devices that forward network data (e.g., data packets) between network nodes. A router 144 includes at least two network interfaces (or "ports") and logic circuitry for identifying, for particular data, an egress port that will move the particular data towards a destination. In some embodiments, the routers 144 direct traffic based on routing configuration data to forward data towards traffic destinations. In some embodiments, the routers 144 forward data according to routing tables. In some embodiments, the routers 144 forward data according to a configuration, e.g., a configuration set by a software defined network ("SDN") controller. In some embodiments, a router 144 includes a content-addressable memory ("CAM") or ternary content-addressable memory ("TCAM"), used in identifying egress ports for routing data. In some embodiments, a router 144 implements additional network functionality, or directs traffic through additional network nodes providing network functionality. For example, a router 144 may pass traffic through a firewall, a network address translator ("NAT"), a network filter, or some other node providing network functionality. In some embodiments, one or more of the routers 144 may be replaced with similar network devices such as a network switch, hub, bridge, multi-homed computing devices, or any other device used for network communications.

In some embodiments, a controller 162 configures the routers 144 to direct traffic from certain client devices 104 to specific servers 138 within the network 104$_c$. In some embodiments, the controller 162 is an SDN controller. In some embodiments, the controller 162 is a router or a switch. In some embodiments, the controller promulgates routing tables to the routers 144. In some embodiments, the controller 162 configures the routers 144 to forward data according to a zone scheme. For example, the controller 162 may determine that traffic from client devices 102 in a first network 104a should be sent to servers 138 in a first zone (e.g., server $138_a$ in "Zone A") and that traffic from client devices 102 in a second network $104_b$ should be sent to servers 138 in a second zone (e.g., server $138_b$ in "Zone B"). The controller 162 may alternatively determine that traffic from some client devices 102 in the second network $104_b$ should be sent to servers 138 in the first zone, e.g., to server $138_a$ in Zone A. These determinations may be made by the controller 162 as described in further detail herein. In some embodiments, the controller 162 uses data stored in a data storage system 166 in making the determinations. In some embodiments, the controller 162 records performance data, or other heuristic input data, in the data storage system 166 for use in assigning client devices to server zones.

As shown in FIG. 1A, one or more servers 138 may be logically grouped (e.g., as a server farm), and may either be geographically co-located (e.g., on premises) or geographically dispersed (e.g., cloud based) from client devices 102 and/or other servers 138. In some embodiments, a server 138 or group of servers 138 executes one or more applications on behalf of one or more of client devices 102 (e.g., as an application server). In some embodiments, the servers 138 provide functionality such as, but not limited to, file server, gateway server, proxy server, or other similar server functions. In some embodiments, client devices 102 may seek access to hosted applications on servers 138. In some embodiments, a network device such as the controller 162 or specific servers 138 may provide load balancing across multiple servers 138 to process requests from client devices 102, act as a proxy or access server to provide access to the one or more servers 138, provide security and/or act as a firewall between a client 102 and a server 138, provide Domain Name Service ("DNS") resolution, provide one or more virtual servers or virtual internet protocol servers, and/or provide a secure virtual private network ("VPN") connection from a client 102 to a server 138, such as a secure socket layer ("SSL") VPN connection and/or provide encryption and decryption operations.

In some embodiments, an application delivery management system provides a hosted computing environment to a client device 102, remote or otherwise, based on authentication and authorization policies applied by a policy engine. A remote client device 102 may obtain a computing environment and access to server-stored applications and data files from any network location. For example, a client device 102 may request an application and data file from a server 138 and, in response, an application delivery system server 138 may deliver the requested application and data file to the client device 102, e.g., via an application stream or via a remote-display protocol such as ICA. In some embodiments, the application delivery system is implemented as any portion of the Citrix Workspace Suite™ by Citrix Systems, Inc., such as XenApp® or XenDesktop®. The application may be any application, e.g., applications related to real-time data communications such as applications for streaming graphics, streaming video and/or audio or other data, delivery of remote desktops or workspaces or hosted services or applications, for example infrastructure as a service ("IaaS"), workspace as a service ("WaaS"), software as a service ("SaaS") or platform as a service ("PaaS").

One or more of servers 138 may include a performance monitoring service or agent. In some embodiments, the controller 162 performs performance monitoring. In some embodiments, one or more designated servers 138 perform performance monitoring. Performance monitoring may be performed using data collection, aggregation, analysis, management and reporting, for example by software, hardware or a combination thereof. Performance monitoring may include one or more agents for performing monitoring, measurement and data collection activities on client devices 102, servers 138, or other agents not shown. In general, monitoring is provided transparently (e.g., in the background) to any application and/or use context. In some embodiments, a server 138 provides a monitoring agent, e.g., any of the product embodiments referred to as EdgeSight by Citrix Systems, Inc. of Fort Lauderdale, Fla.

The monitoring agents may monitor, measure, collect, and/or analyze data at various intervals or on a predetermined frequency, based upon an occurrence of given event(s), or in real time during operation of network environment 100. The monitoring agents may monitor resource consumption and/or performance of hardware, software, and/or communications resources of servers 138, client devices 102, and other components of the network 104. For example, network connections such as a transport layer connection, network latency, bandwidth utilization, end-user response times, application usage and performance, session connections to an application, cache usage, memory usage, processor usage, storage usage, database transactions, client and/or server utilization, active users, user activity duration, application failures (e.g., crashes, exceptions, errors, or hangs), time required to log-in to an application, a server, or the application delivery system, and/or other performance conditions and metrics may be monitored.

In described embodiments, client devices 102, servers 138, and other network devices may be deployed as (or executed on) any type and form of computing device, such as any desktop computer, laptop computer, or mobile device capable of communication over at least one network and performing the operations described herein. For example, the client devices 102, servers 138, and other network devices may each correspond to one computer, a plurality of computers, or a network of distributed computers such as the computing device 101 shown in FIG. 1B.

As shown in FIG. 1B, a computing device 101 may include one or more processors 103, volatile memory 122 (e.g., RAM), non-volatile memory 128, user interface (UI) 123, one or more communications interfaces 118 (e.g., a network interface card ("NIC")), and a communication bus 150. The user interface 123 may include hardware for a graphical user interface ("GUI") 124 (e.g., a touchscreen, a display, etc.), one or more input/output ("I/O") devices 126 (e.g., a mouse, a keyboard, a speaker, etc.). Non-volatile memory 128 stores an operating system 115, one or more applications 116, and data 117 such that, for example, computer instructions of operating system 115 and/or applications 116 are executed by processor(s) 103 out of volatile memory 122. Data 117 may be entered using an input device of GUI 124 or received from I/O device(s) 126. Various elements of the computing device 101 may communicate via communication bus 150. The computing device 101 as shown in FIG. 1B is shown merely as an example, as client devices 102, servers 138, and other network devices may be implemented by any computing or processing environment and with any type of machine or set of machines that may have suitable hardware and/or software capable of operating as described herein.

The processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more of an application specific integrated circuit ("ASIC"), microprocessor, digital signal processor, microcontroller, field programmable gate array ("FPGA"), programmable logic arrays ("PLA"), multi-core processor, or general-purpose computer processor with associated memory. The "processor" may be analog, digital, or mixed-signal. In some embodiments, the "processor" may be one or more physical processors or one or more "virtual" (e.g., remotely located or cloud-based) processors.

The communications interface 118 may include one or more interfaces to enable the computing device 101 to access a computer network 104 such as a LAN, a WAN, or the Internet through a variety of wired and/or wireless or cellular connections. In some embodiments, the communications interface 118 includes one or more network connection points (ports) and an interface controller. Network connection points may be wired connection points (e.g., Ethernet ports) or wireless (e.g., radio circuitry for Wi-Fi or mobile network communications).

The non-volatile memory 128 may include one or more of a hard disk drive ("HDD"), solid state drive ("SSD") such as a Flash drive or other solid state storage media, or other magnetic, optical, circuit, or hybrid-type storage media. In some embodiments, the non-volatile memory 128 includes read-only memory ("ROM"). In some embodiments, storage may be virtualized, e.g., using one or more virtual storage volumes, such as a cloud storage, or a combination of such physical storage volumes and virtual storage volumes.

In described embodiments, a first computing device 101 (e.g., a server 138) may execute an application on behalf of a user of a second computing device 101 (e.g., a client device 102). For example, the first computing device may execute a virtual machine providing an execution session within which applications execute on behalf of a user of the second computing device. For example, the first computing device may provide a hosted desktop session, may execute a terminal services session to provide a hosted desktop environment, or may provide access to a computing environment including one or more of: one or more applications, one or more desktop applications, and one or more desktop sessions in which one or more applications may execute. For example, in some embodiments, the client device 102 is a thin-client, or functions as a thin-client, executing a thin-client protocol or remote-display protocol such as the Independent Computing Architecture ("ICA") protocol created by Citrix Systems, Inc. of Fort Lauderdale, Fla.

In some embodiments, the servers 138 provide services to the client devices 102 via the network(s) 104. For example, the servers 138 may provide hosted desktop services via ICA, as previously described. A client device 102 may submit a service request to the servers 138, which a controller 162 then directs to a specific sever 138 for handling. In some embodiments, the controller 162 directs a service request to a server 138 based on zoning, e.g., in accordance with a zone scheme. For example, the controller 162 may determine that traffic from client devices 102 in a first network $104_a$ should be sent to servers 138 in a first zone (e.g., server $138_a$ in "Zone A") and that traffic from client devices 102 in a second network $104_b$ should be sent to servers 138 in a second zone (e.g., server $138_b$ in "Zone B"). The controller 162 may alternatively determine that traffic from some client devices 102 in the second network $104_b$ should be sent to servers 138 in the first zone, e.g., to server $138_a$ in Zone A. The zones may be portions or sub-networks of a single autonomous system ("AS") network (e.g., as illustrated in FIG. 1A). The zones may be distinct networks within a unified AS, e.g., networks separated by intermediary networks, network boundary devices (e.g., gateways), or other divisions, while still sharing the same network administration. The zones may be distinct AS networks. In some embodiments, a zone is a virtual network. Although depicted in FIG. 1A as an independent device, the controller 162 may be incorporated into one or more network devices, e.g., into a server 138. In some embodiments, the controller 162 assigns requests to zones by using a heuristic to select a zone for the client device 102 submitting the request.

Figure 2:
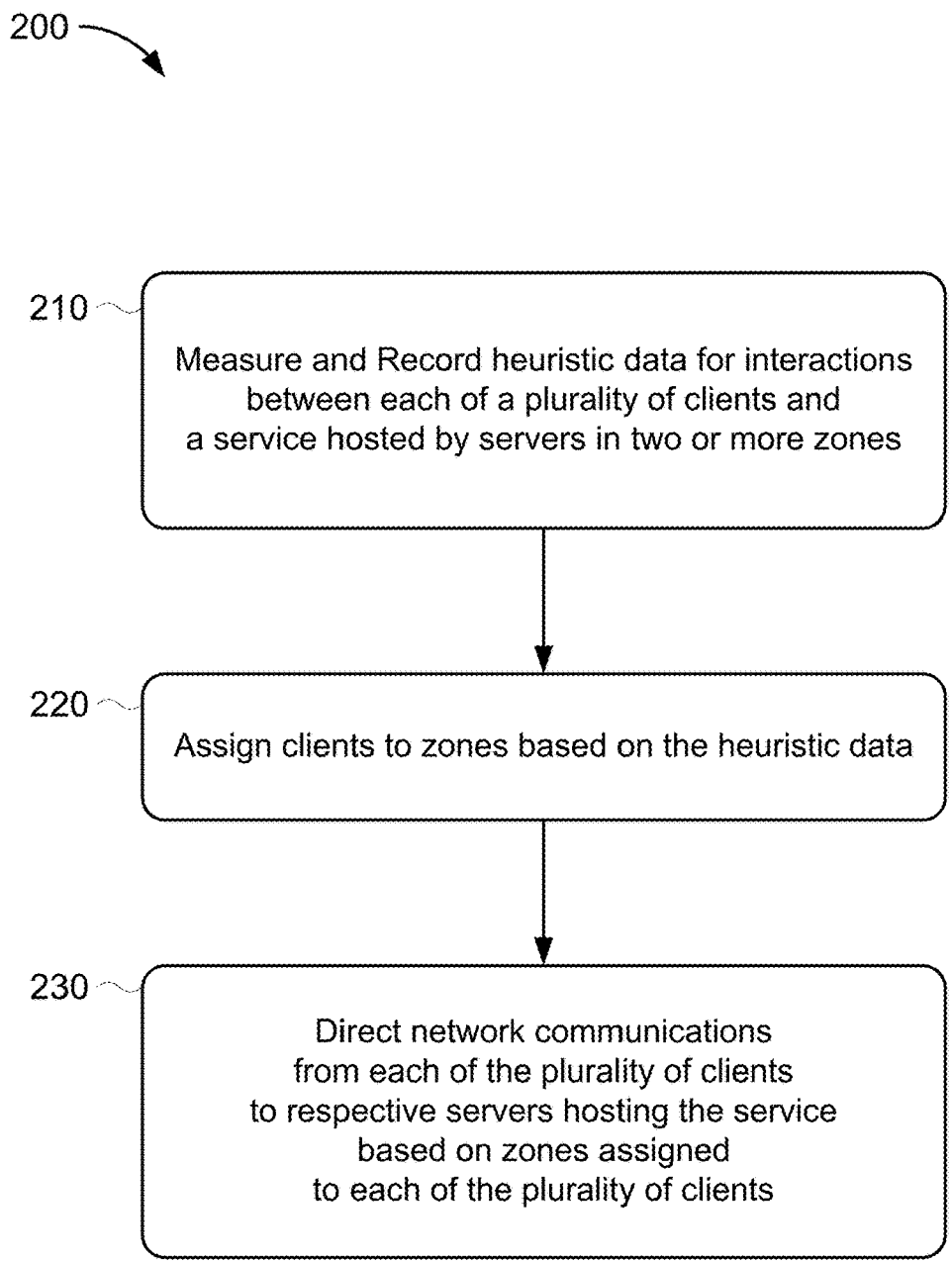
FIG. 2 is a flowchart for an example method of selecting zones based on a heuristic.

FIG. 2 is a flowchart for an example method 200 of selecting zones based on a heuristic. In brief overview of the method 200, at stage 210, a controller 162 measures and records heuristic data for interactions between each of a plurality of client devices 102 and a service hosted servers 138 in two or more zones. At stage 220, the controller 162 assigns clients to zones based on the recorded heuristic data. At stage 230, the controller 162 directs network communications (e.g., new service requests and network communications for subsequent server interactions) from each of the plurality of client devices 102 to respective servers 138 hosting the service based on the respective zones assigned to each of the plurality of clients.

Referring to FIG. 2 in more detail, at stage 210, the controller 162 measures and records heuristic data for interactions between each of a plurality of client devices 102 and a service hosted be servers 138 in two or more zones. For example, the heuristic data may include network latency, application latency, counts of clients serviced, bandwidth utilization, or data for any other metric. In some embodiments, the controller 162 records the heuristic data in a data storage system 166. In some embodiments, the controller 162 records entries in a database, e.g., as records in a database table. For example, the controller 162 may record a network address (e.g., an IP address) for each client device 102, values for latency measurements from interactions between each client device 102 and a corresponding server 138 (e.g., ICA round trip time ("ICA RTT")), and the zone assignment for the measured client interactions. In some embodiments, the controller 162 maintains a table of client address and average latency (e.g., ICA RTT) for various zone assignments. In some embodiments, the controller 162 maintains a table of client address and recent latency (e.g., ICA RTT) for various zone assignments, where the recent latency is limited to a time frame such as discrete hours or a trailing window of time such as the sixty or ninety minutes leading up to a current time. The latency may be analyzed to identify trends and state deviations. Network zone selection based on latency is described in more detail in reference to FIG. 3.

At stage 220, the controller 162 assigns clients to zones based on the recorded heuristic data. In some embodiments, the controller 162 identifies an initial request from a client device 102 that is not yet assigned to a zone and selects a zone assignment using one or more zone selection criteria. For example, the zone selection criteria may include one or more of: a distance between a geographic location of servers 138 and a geological region associated with a network address for the client device 102, a network device (e.g., gateway switch or router) at which the request arrived to the service provider network 104$_c$, (i.e., the arrival or ingress network), an identifier provided by an application executing at the client device 102, a load level for servers 138 in one or more zones (e.g., the zone to be selected as compared to another zone that might be closer, geographically, to the client device). In some embodiments, the zone selection criteria includes analysis of the heuristic data recorded in stage 210. In some embodiments, the controller 162 assigns clients to zones in stages, e.g., first selecting an initial zone based on a first set of default or static parameters (e.g., a subset of zone selection criteria) and then uses additional mitigation criteria to determine whether to assign the initial zone or to select an alternative zone. In some such embodiments, the controller 162 selects the alternative zone based on a comparison between one or more performance characteristics of the initial zone and the alternative zone. In some embodiments, the alternative zone assignment is a pre-selected fallback option.

At stage 230, the controller 162 directs network communications from each of the plurality of client devices 102 to respective servers 138 hosting the service based on the respective zones assigned to each of the plurality of clients. Generally, all communications from a particular client device 102 will be directed to the same zone. However, at times, a client device 102 may be shifted from one zone to another. The controller 162 directs network communications from a particular client, e.g., client device 102$_b$, to servers 138 in a selected zone, e.g., server 138$_b$ in Zone B. If the controller 162 re-assigns the client device 102$_b$ to another zone, e.g., from Zone B to Zone A, the controller 162 redirects network communication from the client device 102$_b$ to the newly assigned zone, e.g., from Zone A, where the client can be serviced by a server 138$_a$ in the newly assigned zone.

In some embodiments, the controller 162 directs network communications from a client device 102 towards a service zone by providing the client device 102 with a specific destination address to use for communications, where the specific destination is associated with the selected zone. In some embodiments, the controller 162 directs network communications from a client device 102 towards a service zone by updating a dynamic name system ("DNS") service to resolve a domain name to an address associated with the selected zone. In some embodiments, the controller 162 directs network communications from a client device 102 towards a service zone by updating routing tables in one or more network devices (e.g., routers 144). In some embodiments, the network 104$_c$ is a software-defined network ("SDN") and the controller 162 is an SDN controller that can directly control routing within the network 104$_c$.

Figure 3:
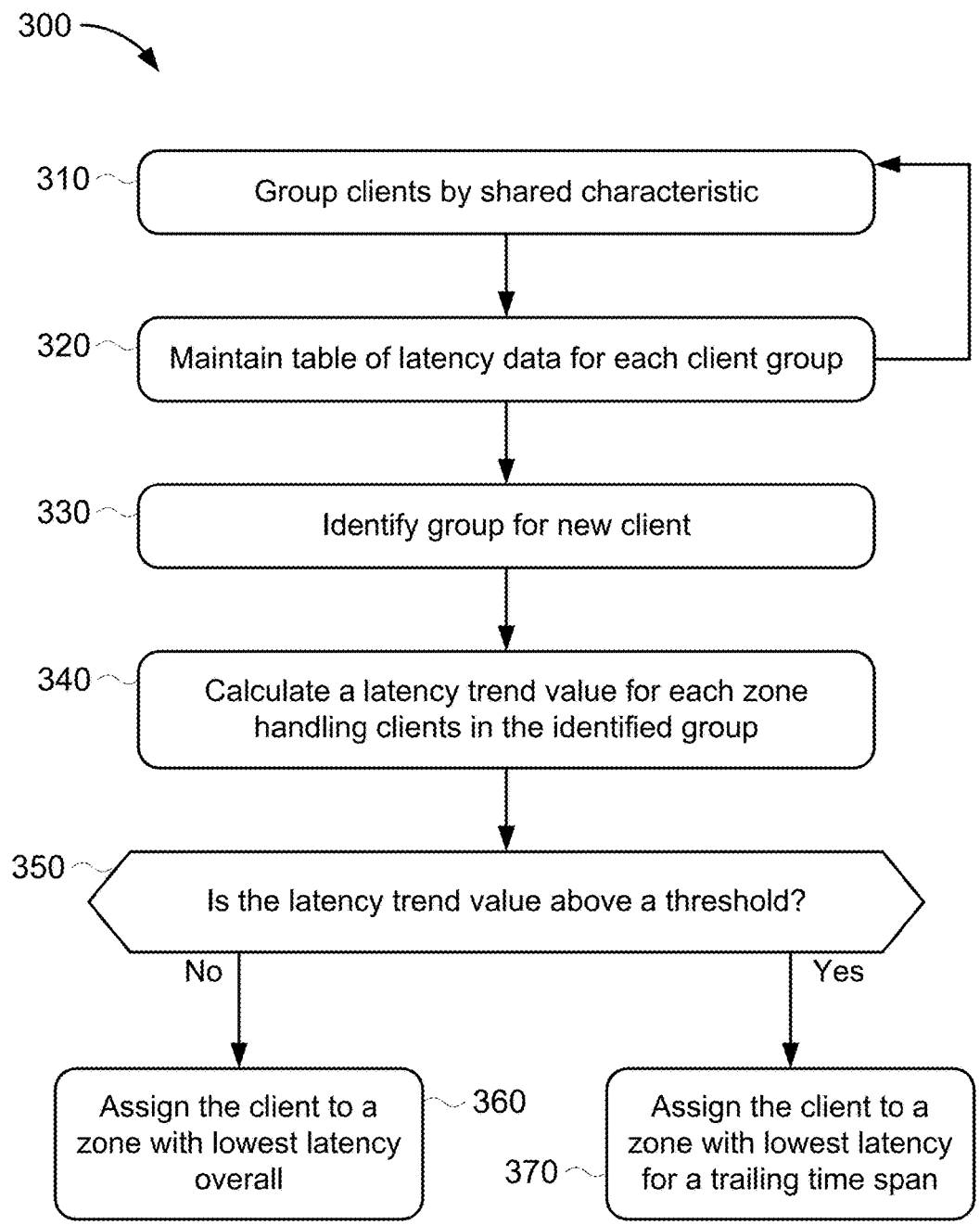
FIG. 3 is a flowchart for an example method of selecting zones using a heuristic based on latency.

FIG. 3 is a flowchart for an example method 300 of selecting zones using a heuristic based on latency. In brief overview of the method 300, at stage 310, a controller 162 groups clients by a shared characteristic and at stage 320 maintains one or more tables of latency data for each client group. Clients may be grouped, for example, by subnet address, subnet mask, network class, geographic location associated with a network address, ingress network, etc. At stage 330, the controller 162 identifies a group for a new client (or a client initiating a new request, a new session, or otherwise in a state ready for zone assignment). At stage 340, the controller 162 calculates a latency trend value for each zone handling clients in the identified group. At stage 350, the controller 162 compares the latency trend value to a threshold. If, at stage 350, the trend value does not exceed the threshold, then at stage 360, the controller 162 assigns the client to a zone with lowest latency overall. Otherwise, if, at stage 350, the trend value does exceed the threshold, then at stage 370, the controller 162 assigns the client to a zone with lowest latency for a trailing time span.

Referring to FIG. 3 in more detail, at stage 310, the controller 162 groups clients by a shared characteristic. Clients may be grouped, for example, by subnet address, subnet mask, network class, geographic location associated with a network address, ingress network, etc. For example, in some embodiments, the controller 162 uses the first 16 bits of the IPv4 network address assigned to a client device 102 to group the client with other devices having the same leading address bits. In some embodiments, the controller 162 uses a configurable number of bits of the IPv4 network address assigned to a client device 102, e.g., allowing an administrator to choose larger groups (e.g., using 8 bits) or a larger number of groups (e.g., using 24 bits).

At stage 320, the controller 162 maintains one or more tables of latency data for each client group. In some embodiments, the controller 162 maintains the tables in a data storage system 166, e.g., in a database. The latency data may be network latency, e.g., IP round trip time ("RTT"), may be application latency (e.g., ICA RTT), or may be latency measured by the controller 162 or measured by an instrumented network device. In some embodiments, the controller 162 maintains a single universal table with entries corresponding to different groups. In some embodiments, the controller 162 maintains discrete tables for each group. In some embodiments, the controller 162 maintains two tables per group, e.g., one table with running latency averages grouped by client and zone assignment and one table with latency averages over specific time spans grouped by client and zone assignment. The latency averages over specific time spans may be for fixed windows of time such as entries by the hour, or for a sliding window of time such as a trailing time span of the sixty or ninety minutes leading up to the present. In some embodiments, the controller 162 records latency measurement entries that it can then later use to calculate averages.

At stage 330, the controller 162 identifies a group for a new client (or a client initiating a new request, a new session, or otherwise in a state ready for zone assignment). The controller 162 groups the new client with other clients having the same shared characteristic, as described in reference to stage 310.

At stage 340, the controller 162 calculates a latency trend value for each zone handling clients in the identified group. In some embodiments, the controller 162 calculates a regression co-efficient for latency average and uses the co-efficient as the latency trend value. For example, in some embodiments, the controller 162 identifies the regression co-efficient for deltas between averages over hourly blocks of latency data for client devices in the group. In some embodiments, the controller 162 compares an average latency for a group over an extensive timespan compared to a trailing window timespan, where the extensive timespan includes at least some amount of time more than the trailing window (e.g., at least ten or one hundred times more time than the trailing window). In some such embodiments, the controller 162 uses a ratio of the trailing window's offset from the extensive timespan average as the latency trend value. In some embodiments, the controller 162 first identifies the latency trend value for a first-choice zone and then identifies latency trend values for one or more alternative zones if the latency trend value for the first-choice zone exceeds a threshold (e.g., as determined in stage 350). In some embodiments, the controller 162 identifies the latency trend values for all available zone options.

At stage 350, the controller 162 compares the latency trend value to a threshold. For example, in some embodiments, the controller 162 determines whether the regression coefficient calculated in stage 340 exceeds 50%. In some embodiments, the threshold can be adjusted or configured by an administrator.

At stage 360, if the trend value did not exceed the threshold at stage 350, then the controller 162 assigns the client to a zone with lowest latency overall. For example, the controller 162 may use a database table with extensive latency data for the client device group to select a zone for the client device. In some embodiments, if the trend value did not exceed the threshold, then the controller 162 assigns the client to a zone selected using a non-heuristic based approach. For example, the controller 162 may assign the client device to a zone based on geography, arrival network, network address, or some other non-heuristic based parameter (or parameters). In some embodiments, the controller 162 assign the client device to a zone selected with an overall latency below the threshold.

At stage 370, if the trend value exceeds the threshold at stage 350, then the controller 162 assigns the client to a zone with lowest latency for a trailing time span. For example, the controller 162 may use a database table with timespan-based latency data for the client device group to select a zone for the client device. In some embodiments, the timespan-based latency data is stored in blocks of time, e.g., latency over one-hour time spans, and the controller 162 assigns the client to a zone with lowest latency for the last time span (or last few time spans) in the table. The zone selected in stage 370 may differ from the zone that would have been selected in stage 360. For example, the zone selected in stage 370 may be less proximate to the client device but have lower immediate latency.

The systems and methods described may be used in a variety of embodiments. For example, and without limitation:

In at least one aspect, the above describes a method for zone selection for distributed services. The method includes recording, by a device comprising a processor, latency data measured for interactions between each of a plurality of clients and a service hosted by servers in two or more zones. The method includes directing, by the device, network communications from each of the plurality of clients to respective servers hosting the service based on zones assigned to each of the plurality of clients. The method includes assigning, by the device, a first client to a first zone by: identifying a first grouping for the first client, determining, for the first client, that the recorded latency data indicates that latency for clients in the first grouping is not increasing faster than a threshold rate, and selecting, responsive to the determining for the first client, a first zone indicated by a first set of recorded latency data as lowest in latency. The method includes assigning, by the device, a second client to a second zone by: identifying a second grouping for the second client, determining, for the second client, that the recorded latency data indicates that latency for clients in the second grouping is increasing faster than the threshold rate, and selecting, responsive to the determining for the second client, a second zone indicated by a second set of the recorded latency data as lowest in latency, the second set differing from the first set of the recorded latency data.

Some embodiments of the method include selecting the second set of the recorded latency data based on time values associated with the recorded latency data. Some embodiments of the method include selecting the second set of the recorded latency data to include only latency records recorded within a pre-defined time span. Some embodiments of the method include identifying the first grouping for the first client based on a first network address range that includes the first client and identifying the second grouping for the second client based on a second network address range that includes the second client.

In some embodiments of the method, the latency data indicates latency measured in terms of one of: network round trip time and service response time. In some embodiments of the method, the latency data includes source network address ranges, average latency for each of the network address ranges, and zone assignments corresponding to an average latency for each of the network address ranges. In some embodiments of the method, the threshold rate corresponds to a regression coefficient of 0.5. In some embodiments of the method, the second zone includes a server with a network path to the first client that is shorter than any network path between the first client and any server in the first zone. In some embodiments of the method, the second set of latency data is a sub-set of the first set of latency data.

In at least one aspect, these methods may be encoded as computer-readable instructions for execution by one or more processors. The computer-readable instructions can be encoded on non-transitory computer-readable media.

In at least one aspect, the above describes a system for zone selection for distributed services, the system including a processor configured to record latency data measured for interactions between each of a plurality of clients and a service hosted by servers in two or more zones and direct network communications from each of the plurality of clients to respective servers hosting the service based on zones assigned to each of the plurality of clients. The processor is configured to assign a first client to a first zone by identifying a first grouping for the first client, determining, for the first client, that the recorded latency data indicates that latency for clients in the first grouping is not increasing faster than a threshold rate, and selecting, responsive to the determining for the first client, a first zone indicated by a first set of recorded latency data as lowest in latency. The processor is configured to assign a second client to a second zone by identifying a second grouping for the second client, determining, for the second client, that the recorded latency data indicates that latency for clients in the second grouping is increasing faster than the threshold rate, and selecting, responsive to the determining for the second client, a second zone indicated by a second set of the recorded latency data as lowest in latency, the second set differing from the first set of the recorded latency data.

In some embodiments of the system, the processor is configured to execute instructions to select the second set of the recorded latency data based on time values associated with the recorded latency data. In some embodiments of the system, the processor is configured to execute instructions to select the second set of the recorded latency data to include only latency records recorded within a pre-defined time span. In some embodiments of the system, the processor is configured to execute instructions to identify the first grouping for the first client based on a first network address range that includes the first client and identifying the second grouping for the second client based on a second network address range that includes the second client.

In some embodiments of the system, the latency data indicates latency measured in terms of one of: network round trip time and service response time. In some embodiments of the system, the latency data includes source network address ranges, average latency for each of the network address ranges, and zone assignments corresponding to an average latency for each of the network address ranges. In some embodiments of the system, the threshold rate corresponds to a regression coefficient of 0.5. In some embodiments of the system, the second zone includes a server with a network path to the first client that is shorter than any network path between the first client and any server in the first zone. In some embodiments of the system, the second set of latency data is a sub-set of the first set of latency data.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method of zone selection for distributed services, the method comprising:
   recording, by a device comprising a processor, latency data measured for interactions between each of a plurality of clients and a service hosted by servers in two or more zones of a network;
   routing, by the device, network communications from each of the plurality of clients to respective servers hosting the service via the network based on the zones assigned to each of the plurality of clients;
   assigning, by the device, a first client to a first zone of the network by:
      identifying a first grouping of clients for the first client,
      determining, for the first client, that the recorded latency data indicates that a rate of change in latency for the clients in the first grouping is not increasing faster than a threshold rate, and
      selecting, responsive to the determining for the clients in the first grouping, the first zone indicated by a first set of recorded latency data as lowest in latency; and
   assigning, by the device, a second client to a second zone of the network by:
      identifying a second grouping of clients for the second client,
      determining, for the second client, that the recorded latency data indicates that a rate of change in latency for the clients in the second grouping is increasing faster than the threshold rate, and
      selecting, responsive to the determining for the clients in the second grouping, the second zone indicated by a second set of the recorded latency data as lowest in latency, the second set differing from the first set of the recorded latency data.

2. The method of claim 1, wherein the latency data indicates latency measured in terms of one of: network round trip time and service response time.

3. The method of claim 1, wherein the latency data includes source network address ranges, average latency for each of the network address ranges, and zone assignments corresponding to an average latency for each of the network address ranges.

4. The method of claim 1, wherein the threshold rate corresponds to a regression coefficient of 0.5.

5. The method of claim 1, comprising selecting the second set of the recorded latency data based on time values associated with the recorded latency data.

6. The method of claim 5, comprising selecting the second set of the recorded latency data to include only latency records recorded within a pre-defined time span.

7. The method of claim 1, comprising:
   identifying the first grouping for the first client based on a first network address range that includes the first client; and
   identifying the second grouping for the second client based on a second network address range that includes the second client.

8. The method of claim 1, wherein the second zone includes a server with a network path to the first client that is shorter than any network path between the first client and any server in the first zone.

9. The method of claim 1, wherein the first set of latency data is latency data associated with the first grouping and the second set of latency data is associated with the second grouping.

10. The method of claim 1, wherein the second set of latency data is a sub-set of the first set of latency data.

11. A system for zone selection for distributed services, the system comprising a processor configured to:
   record latency data measured for interactions between each of a plurality of clients and a service hosted by servers in two or more zones of a network;
   route network communications from each of the plurality of clients to respective servers hosting the service via the network based on the zones assigned to each of the plurality of clients; and
   assign a first client to a first zone of the network by:
      identifying a first grouping of clients for the first client,
      determining, for the first client, that the recorded latency data indicates that a rate of change in latency for the clients in the first grouping is not increasing faster than a threshold rate, and
      selecting, responsive to the determining for the clients in the first grouping, the first zone indicated by a first set of recorded latency data as lowest in latency; and
   assign a second client to a second zone of the network by:
      identifying a second grouping of clients for the second client,
      determining, for the second client, that the recorded latency data indicates that a rate of change in latency for the clients in the second grouping is increasing faster than the threshold rate, and
      selecting, responsive to the determining for the clients in the second grouping, the second zone indicated by a second set of the recorded latency data as lowest in latency, the second set differing from the first set of the recorded latency data.

12. The system of claim 11, wherein the latency data indicates latency measured in terms of one of: network round trip time and service response time.

13. The system of claim 11, wherein the latency data includes source network address ranges, average latency for each of the network address ranges, and zone assignments corresponding to an average latency for each of the network address ranges.

14. The system of claim 11, wherein the threshold rate corresponds to a regression coefficient of 0.5.

15. The system of claim 11, the processor further configured to select the second set of the recorded latency data based on time values associated with the recorded latency data.

16. The system of claim 15, the processor configured to select the second set of the recorded latency data to include only latency records recorded within a pre-defined time span.

17. The system of claim 11, the processor further configured to:

identify the first grouping for the first client based on a first network address range that includes the first client; and identify the second grouping for the second client based on a second network address range that includes the second client.

18. The system of claim 11, wherein the second zone includes a server with a network path to the first client that is shorter than any network path between the first client and any server in the first zone.

19. The system of claim 11, wherein the first set of latency data is latency data associated with the first grouping and the second set of latency data is associated with the second grouping.

20. The system of claim 11, wherein the second set of latency data is a sub-set of the first set of latency data.

* * * * *